United States Patent Office 2,786,019
Patented Mar. 19, 1957

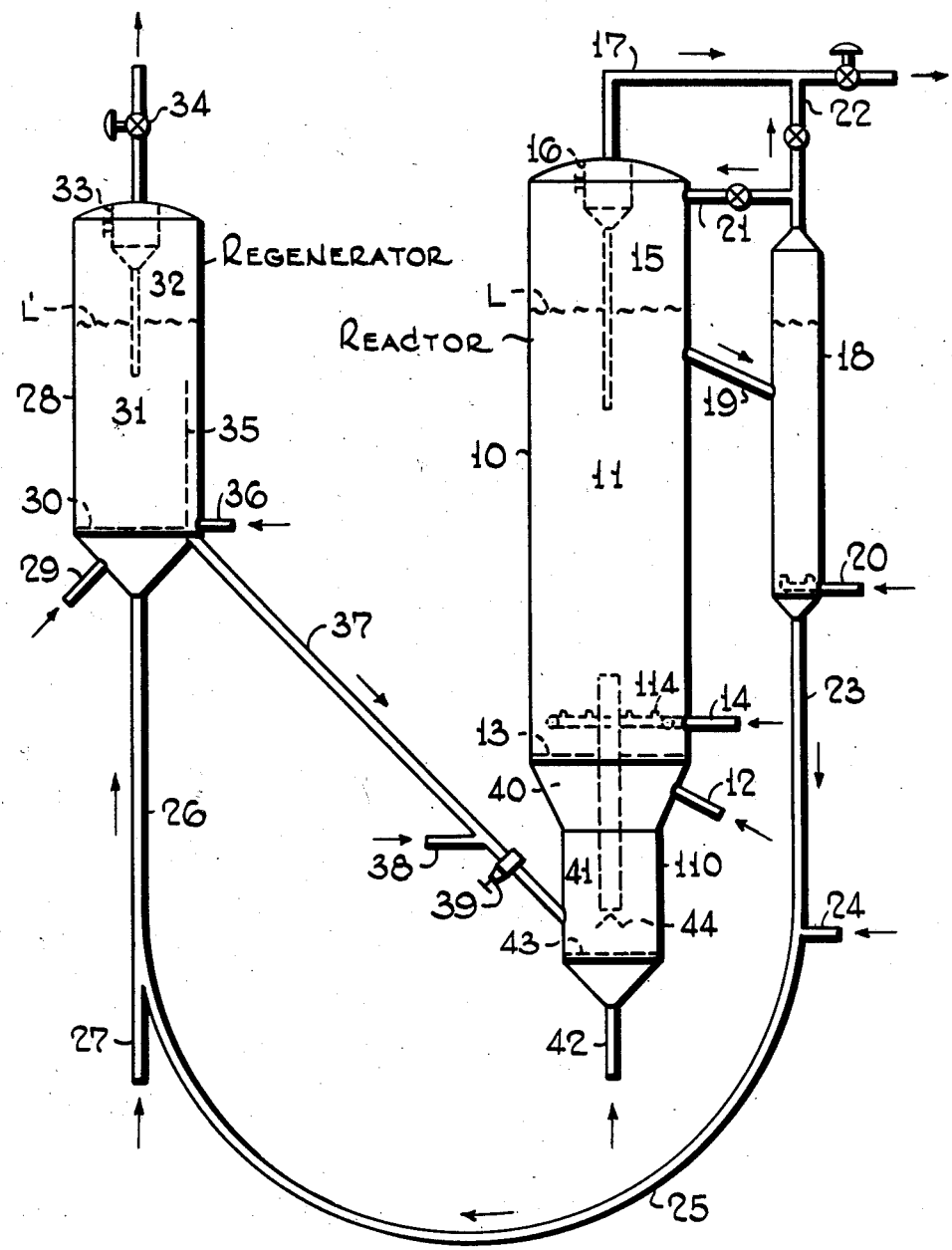

2,786,019
FLUID HYDROFORMING

Edward W. S. Nicholson, Baton Rouge, La., assignor to Esso Research and Engineering Company, a corporation of Delaware Application December 26, 1951, Serial No. 263,448

4 Claims. (Cl. 196—50)

This invention relates to the catalytic conversion of hydrocarbon fractions boiling within the motor fuel boiling range of low knock rating into high octane number motor fuels rich in aromatics and particularly to a process whereby such a conversion is effected by the fluidized solids technique.

Hydroforming is a well known and widely used process for treating hydrocarbon fractions boiling within the motor fuel or naphtha range to upgrade the same or increase the aromaticity and improve the anti-knock characteristics of said hydrocarbon fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are ordinarily carried out in the presence of hydrogen or hydrogen-rich recycle gas at temperatures of 750–1150° F. in the pressure range of about 50–1000 lbs. per sq. inch, and in contact with such catalysts as molybdenum oxide, chromium oxide, or, in general, oxides or sulfides of metals of groups IV, V, VI, VII and VIII of the Periodic System of elements alone, or generally supported on a base or spacing agent such as alumina gel, precipitated alumina or zinc aluminate spinel. A good hydroforming catalyst is one containing about 10 wt. percent molybdenum oxide upon an aluminum oxide base prepared by heat treating a hydrated aluminum oxide or upon a zinc aluminate spinel.

It has been proposed in application Serial No. 188,236, filed October 3, 1950, now Patent No. 2,689,823 to effect the hydroforming of naphtha fractions in a fluidized solids reactor system in which naphtha vapors are passed continuously through a dense, fluidized bed of hydroforming catalyst particles in a reaction zone, spent catalyst particles being withdrawn from the dense bed in the reaction zone and passed to a separate regeneration zone where inactivating carbonaceous deposits are removed by combustion whereupon the regenerated catalyst particles are returned to the main reactor vessel. Fluid hydroforming as thus conducted has several fundamental advantages over fixed bed hydroforming such as (1) the operations are continuous, (2) the vessels and equipment can be designed for single rather than dual functions, (3) the reactor temperature is substantially constant throughout the bed, and (4) the regeneration or reconditioning of the catalyst may be readily controlled.

A particular advantage of the foregoing fluid solids operation has been the fact that the freshly regenerated catalyst can be utilized to carry part of the necessary heat requirements for the hydroforming reaction from the regeneration zone into the reaction zone. It has been proposed in this connection to discharge hot, regenerated catalyst particles from the regenerator standpipe into a stream of hot, hydrogen-rich recycle gas in a transfer line whereby the catalyst particles are subjected to a reconditioning treatment during their passage through the transfer line into the reaction zone. This pretreatment involves at least a partial reduction of a higher catalytic metal oxide formed during regeneration to a form of lower oxide of the catalytic metal which is more catalytically active. In view of the high temperature of the regenerated catalyst (1100–1300° F.) and the exothermic character of the reaction between the hot, freshly regenerated catalyst and the hydrogen-rich gas, it is necessary to make the transfer line small in diameter and of very short length in order to keep the time of contact of the regenerated catalyst and hydrogen-containing gas sufficiently short to avoid overtreatment and/or thermal degradation of the catalyst.

It is the object of this invention to provide a novel method for treating freshly regenerated hydroforming catalyst preparatory to recycling the same to a fluidized solids hydroforming reactor.

It is also the object of this invention to provide a method and apparatus whereby freshly regenerated hydroforming catalyst may be treated at relatively low temperatures while effectively utilizing the hot regenerated catalyst for supplying at least about twenty-five percent of the heat required for the hydroforming reaction.

These and other objects will appear more clearly from the detailed specification and claims which follow:

It has now been found that freshly regenerated hydroforming catalyst can be pretreated with a hydrogen-containing gas at relatively low temperatures for any desired period while still effectively supplying a part of the heat required for the hydroforming reaction by intermixing the hot regenerated catalyst with a body of reactor catalyst in a pretreating zone beneath the main reactor zone, contacting the resultant catalyst mixture with a hydrogen-containing gas to partially reduce the catalytic metal oxide and convert the same to its most catalytically active form and to convey the treated mixture upwardly from the pretreatment zone into the main reaction zone. By properly proportioning the amount of reactor catalyst supplied to the pretreatment zone, the freshly regenerated catalyst is rapidly brought to the temperature most suitable for the hydrogen pretreatment while at the same time the sensible heat contained in the freshly regenerated catalyst is transferred into the reaction zone thereby reducing the amount of heat that must be supplied to the reaction zone by circulation of preheated or superheated recycle gas and/or by preheating of the naphtha feed.

Reference is made to the accompanying drawing illustrating one embodiment of the present invention.

In the drawing, 10 is a reactor vessel which may desirably be a vertical cylindrical vessel of considerable length and which has a pretreating vessel or section 110 of smaller cross sectional area attached to the bottom thereof. The reactor is charged with a hydroforming catalyst such as molybdenum oxide upon an alumina support which is in a finely divided form and maintained as a dense fluidized turbulent bed 11 by the passage therethrough of hydrogen-rich gas introduced through inlet line 12 and perforated plate or distribution grid 13 and vaporized hydrocarbons introduced through inlet line 14 to distributor ring 114. The bed 11 has a definite level L and is superposed by a dilute or disperse phase 15 comprising gaseous or vaporous reaction products containing a small amount of catalyst entrained therein. The reaction products are taken overhead from reactor vessel 10, preferably after passage through a cyclone separator 16 which serves to knock out entrained catalyst which is then returned to the dense bed 11 via the dip pipe provided at the bottom of separator 16. The reaction products pass overhead through line 17 to suitable fractionating, pressure reducing, stabilizing and/or storage equipment.

Means are provided for the withdrawal of catalyst directly from the dense bed 11. This may either be in the form of a cell or conduit arranged entirely within the reactor and provided with one or more ports or restricted passageways for the discharge of catalyst into said conduit or it may comprise a conduit 18 arranged externally of the reactor 10 and connected to the reactor by means of connector conduit 19 for the withdrawal of a stream of catalyst from the dense bed 11. A gas such as steam, nitrogen, or the like is supplied to conduit 18 at one or more points such as 20 in order to strip out entrained reaction products or vaporizable materials from the spent catalyst particles, the stripping vapors passing overhead from conduit 18 either into the dilute phase 15 in the reactor vessel 10 via line 21 if it is desired to separate any catalyst particles that may be entrained in the stripping vapors and there is no objection to the reintroduction into the reactor of spent catalyst that has been contacted with the stripping agent or via line 22 into product outlet line 17 if it is desired to have the stripping vapors by-pass the reactor.

The lower end of stripper 18 is necked down or reduced in diameter and connected to a standpipe 23 which develops the fluistatic pressure necessary to facilitate the transfer of the catalyst to the regeneration system. Although the catalyst flowing from the stripper conduit 18 into the standpipe 23 will ordinarily carry entrained or trapped gas with it in an amount sufficient to maintain it in freely flowing fluid condition, one or more taps 24 may be provided along standpipe 23 and transfer line 25 to facilitate start-up of the equipment or to take care of emergencies that might arise. The stripped spent catalyst is discharged from transfer line 25 into spent catalyst riser 26 where it is picked up by a stream of air or regeneration gas supplied through inlet line 27 and is conveyed into regenerator vessel 28. In order to prevent overheating of the catalyst upon contact with the regeneration gas or air, only a part of the air, generally not more than about 15 to 40% of the total air required for regeneration, is supplied through inlet line 27 to lift or convey the spent catalyst through riser 26 into regenerator 28. The remainder of the air necessary for regeneration is supplied to regenerator 28 through inlet line 29. In order to insure uniform distribution of the incoming air over the entire cross section of the regeneration vessel it may be desirable to provide a perforated plate or distribution grid 30 at the lower end of the vessel. The velocity of the regeneration gases through vessel 28 is so controlled as to form a dense, fluidized, liquid-simulating bed 31 of catalyst particles and gas having a definite level L' superposed by a dilute or disperse phase 32. Regeneration gases are taken overhead from regenerator 28 through a cyclone separator 33 or the like which removes entrained catalyst and returns the separated catalyst to the dense bed 31 via the dip leg attached to the bottom of the cyclone. The regeneration gases are then passed through a pressure reducing valve in outlet line 34 and thence to a stack or to suitable scrubbing and/or storage means if it is desired to utilize this gas for stripping in the system. In view of the fact that the oxidative reactions that occur in the regenerator generate more heat than can normally be transferred to the reactor by the circulating catalyst stream at low catalyst to oil ratios without exceeding safe temperature limits, it is ordinarily necessary to provide cooling coils in the regenerator to control the regenerator temperature. A very desirable arrangement is to provide a primary cooling coil entirely below the dense bed level L' and a secondary coil partly below and partly above the dense bed level L' to permit adjustment of the heat exchange capacity by simply varying the dense bed level L' in the regenerator.

Regenerator catalyst is withdrawn from dense bed 31 through conduit 35 which extends downwardly through the dense bed 31, the grid member 30 and the bottom of the regenerator vessel into transfer line 37. Stripping gas is introduced into conduit 35 at 36 and if desired further amounts of stripping gas may be introduced into transfer line 37 as at 38. Stripping of the regenerated catalyst may be effected with air, nitrogen or flue gas or mixtures of these. It is preferred to introduce air at 36 to strip and/or effect a final clean up of the regenerated catalyst and then to purge the stream of regenerated catalyst by introducing a small amount of nitrogen into the transfer line 37 at 38. If flue gas is used for stripping the regenerated catalyst, it is preferred to wash it free of carbon dioxide and carbon monoxide since it is advisable to exclude these gases from the reaction zone.

The stripped regenerated catalyst is discharged from transfer line 37 through a flow control or slide valve 39 into the side of pretreating vessel or section 110 arranged below the main reaction zone, or vessel 10. A downcomer or conduit 40 connects the main reaction zone dense bed 11 with pretreatment zone bed 41 for permitting the discharge of substantial amounts of reactor catalyst from dense bed 11 into the pretreatment zone. The rate of flow of reactor catalyst through conduit 40 into pretreatment zone or vessel 110 is correlated to the rate of supply of regenerated catalyst through line 37 so that the temperature of the catalyst mixture in bed 41 in the pretreatment zone is below 1050° F., preferably about 950–1000° F. Hydrogen-containing gas is supplied to the pretreatment zone by means of inlet line 42 and through perforated plate or grid 43 into bed 41. A baffle 44 is preferably arranged below the conduit 40 to prevent the hydrogen-containing gas from passing upwardly through conduit 40 and thus interfering with the flow of reactor catalyst into the pretreatment chamber. The hydrogen-containing gas reacts with the regenerated catalyst to effect a partial reduction of the higher catalytic metal oxides formed in the regeneration and further acts as carrier gas to carry catalyst particles upwardly through the distributor grid 13 in admixture with the main stream of hydrogen-containing gas supplied through inlet line 12.

The feed or charging stock to the hydroforming reactor may be a virgin naphtha, a cracked naphtha, a Fischer-Tropsch naphtha or the like. The feed stock is preheated alone or in admixture with recycle gas to reaction temperature or to the maximum temperature possible while avoiding thermal degradation of the feed stock. Ordinarily preheating of the feed stock is carried out to temperatures of about 800–1050° F., preferably about 1000° F. The naphtha preheat should be as high as possible while avoiding thermal degradation thereof as by limiting the time of residence in the furnace and the transfer or feed inlet lines. The preheated feed stock may be supplied to the reaction vessel in admixture with hydrogen-rich recycle gas or it may be introduced separately as shown. The recycle gas, which contains from about 50 to 70 vol. percent hydrogen is preheated to temperatures of about 1150°–1300° F., preferably about 1200° F., prior to the introduction thereof into inlet line 12. The major proportion (at least 50% and preferably up to about 85%) of the recycle gas is introduced directly into the bottom of reactor vessel 10 through line 12 while a minor proportion or the remainder of the recycle gas is introduced into the pretreatment zone 110 through inlet line 42. The recycle gas should be circulated through the reactor at a rate of from about 1000 to 8000, preferably about 4000 cu. ft. per bbl. of naphtha feed.

The reactor system is charged with a mass of finely divided hydroforming catalyst particles. Suitable catalysts include group VI metal oxides, such as molybdenum oxide, chromium oxide or tungsten oxide or mixtures thereof upon a carrier such as activated alumina, zinc aluminate spinel or the like. Preferred catalysts contain about 5 to 15 wt. percent molybdenum oxide or from about 10 to 40 wt. percent chromium oxide upon a suitable carrier. If desired minor amounts of stabilizers and promotors such as silica, calcium oxide, ceria or potassia can be included in the catalyst. The catalyst particles are, for the most part, between 200 and 400 mesh in size or about 0–200 microns in diameter with a major proportion between 20 and 80 microns.

The hydroforming reactor vessel should be operated at temperatures between about 850° and and 950° F., preferably about 900° F. and at pressures between 50 and 500 lbs. per sq. inch, preferably about 200 lbs. per sq. inch. Temperatures above 900° F. result in increased carbon formation and lower selectivity to gasoline fractions while at temperatures below about 900° F. operating severity is low and would therefore require an excessively large reaction vessel. Lowering reactor pressure below 200 lbs. per sq. inch ordinarily results in increased carbon formation which becomes excessive in most cases at pressures below about 75 lbs. per sq. inch. Above 200 lbs., however, catalyst selectivity to light products ($C_4$'s or lighter) increases rapidly. The regenerator is operated at essentially the same pressure as the reactor vessel and at temperatures of from about 1050° to 1300° F. The average residence time of the catalyst in the reactor vessel is of the order of from about 1 to 4 hours and the spent catalyst withdrawn from the reactor will ordinarily have about 0.8 to 2.0 wt. percent of carbonaceous deposits thereon. The average residence time of the catalyst in the regenerator is of the order of from about 3 to 15 minutes and the regenerated catalyst will generally have less than 0.5 wt. percent of carbon, preferably below about 0.1 to 0.2 wt. percent of carbon thereon.

The weight ratio of catalyst to oil introduced into the reactor should be about 0.5 to 1.5. It is preferred to operate at catalyst to oil ratios of about 1 since ratios above about 1 to 1.5 result in excessive carbon formation. Somewhat heigher weight ratios can be used at higher pressures.

Space velocity or the weight in pounds of feed charged per hour per pound of catalyst in the reactor depends upon the age or activity level of the catalyst, the character of the feed stock and the desired octane number of the product. Space velocity for a molybdenum oxide on alumina gel catalyst may vary, for example, from about 1.5 wt./hr./wt. to about 0.15 wt./hr./wt.

Since temperature in the regenerator is maintained between about 1050° and about 1300° F. the regenerated catalyst discharged to the riser or pretreatment zone will be at substantially the same temperature. Reactor catalyst recycle through line 40 to pretreatment zone 110 is conducted at such a rate as to reduce the temperature of the freshly regenerated catalyst to a temperature of 1050° F. or below, preferably to about 950° to 1000° F. Since the cooling of the regenerated catalyst is effected by direct heat exchange with recycle reactor catalyst, the sensible heat of the freshly regenerated catalyst is effectively transferred to the reactor zone. Moreover, because of the reduced temperature of the regenerated catalyst and the heat adsorption capacity of the recycle reactor catalyst, it is possible to control the temperature and/or the time of pretreatment of the regenerated catalyst in pretreatment zone 110 so as to avoid thermal degradation or overtreatment of the catalyst. The residence time of the catalyst in the pretreatment zone may be from 5 to 20 seconds although at the temperatures indicated, the residence time may be as long as 10–15 minutes without having any detrimental effects upon the catalyst.

Example I

In order to determine the effect of temperature on the rate and extent of reduction of molybdena, experiments were carried out at atmospheric pressure in which a molybdena-alumina catalyst and pure $MoO_3$ were contacted with a stream of pure hydrogen at various temperatures for extended periods of time. The data are summarized below.

| | Temp., °F. | Equivalent Form of Molybdena | |
|---|---|---|---|
| | | After 6 Hrs. | After 40 Hrs. |
| 10% $MoO_3$ on Alumina [1] | 900 | $Mo_2O_5$ | 70% $Mo_2O_5$+30% $MoO_2$ |
| | 1,200 | $Mo_2O$ | Mo |
| C. P. $MoO_3$ | 900 | $MoO_2$ | $MoO_2$ |
| | 1,000 | $MoO_2$ | $MoO_2$ |
| | 1,100 | $Mo_2O$ | Mo |

[1] Regenerated at 1,200° F. to convert all molybdenum to $MoO_3$ prior to reduction.

These experiments show that the $MoO_3$ on the alumina base is less easily reduced than the pure $MoO_3$ (unsupported). At normal reaction temperatures for hydroforming (about 900° F.), it requires an exceedingly long time to reduce the molybdenum on the catalyst significantly below an equivalent oxidation state of $Mo_2O_5$. At temperatures up to almost 1100° F., the pure unsupported molybdenum can be easily reduced in $H_2$ below $Mo_2O_5$ but not below $MoO_2$. At the high temperatures of 1100°–1200° F. desirable commercially from the standpoint of simplicity of equipment, and, hence, of economics, the molybednum can be readily reduced below $MoO_2$ and even to metallic molybdenum. This is representative of over-pretreatment, and poor catalyst activity results.

Example II

The results of over-pretreatment in relation to catalyst activity and selectivity may be seen from the following experiments carried out on a continuous 50 B./D. fluid hydroforming pilot plant with a 10% $MoO_3$ on alumina catalyst and feeding a 200–350° F. virgin Louisiana naphtha at 900° F., 200 p. s. i. g., 0.2 wt./hr./wt., 1 C./O., 4000 C. F./B., with complete regeneration of the catalyst.

| 50 B./D. Unit Run No. | 6C–1 | 6D–1 | 6E–1 | 6B–3 |
|---|---|---|---|---|
| Pretreating Temperature, °F. | 1,000 | 1,100 | 1,160 | 1,150 |
| Pretreating Time, Sec. | 2–3 | 2–3 | 2–3 | 60–90 |
| Valence State [1] of Reactor Catalyst | 4.9 | 4.7 | 4.7 | 4.5 |
| CFR–R Clear O. N. of $C_5$–430 °F. Gasoline Produced | 97.4 | 94.1 | 94.0 | 87.4 |
| Yield of $C_5$–403 °F. Gasoline at 90 CFR–R Octane No., Vol. Percent | 84 | 82 | 81 | 79.5 |

[1] The valence state is defined as follows: $MoO_3$=valence of 6.0; $Mo_2O_5$=valence of 5.0; $MoO_2$=valence of 4.0. Thus, an average valence state of 4.5 could be made up of equal parts of $MoO_2$ and $Mo_2O_5$. However, the average valence state alone does not give any exact information about the types of oxides present for an average valence state of 4.5 could be represented equally well by 1 part of $MoO_3$ and 3 parts of $MoO_2$.

It is apparent from the above experiments that the more reduced states resulted in poorer catalyst activity and selectivity, and this is probably due to some of the molybdena being reduced, under the more severe reducing conditions, to the very low oxides, or even metallic molybdenum, which have little or no catalytic activity. For maximum catalyst activity, an average valence state close to 5.0 is desirable, and this can readily be controlled by carrying out the pretreatment at low temperatures.

Example III

Additional experiments were carried out in a batch-fluid cyclic hydroforming pilot unit feeding a 200°–350° F. virgin Louisiana naphtha over 10% $MoO_3$ on alumina catalyst at 200 p. s. i. g. 900° F., 0.3 wt./hr./wt., 3000 C. F./B. gas rate, for 4-hour hydroforming periods. The time and temperature of pretreating the catalyst before each hydroforming period were varied and the following results were obtained.

| Pretreat Conditions | | Catalyst Activity (Octane No. of Product at 0.3 Wt./Hr./Wt.) | Catalyst Selectivity (Yield of 90 CFR-R Octane No. Product, Vol. Percent) |
|---|---|---|---|
| Time, Min. | Temp., °F. | | |
| 1 | 900 | 91 | 83 |
| 15 | 900 | 91 | 82 |
| 1 | 1,150 | 89 | 80 |
| 15 | 1,150 | 87 | 79 |

Here again it is shown that both the activity and selectivity of the catalyst are impaired by pretreating at high temperatures for times of the order of one minute or more, and the longer the time at high temperature, the poorer the results. On the other hand, extending the time of pretreating at low temperatures to as much as 15 minutes has no appreciable effect of the catalyst.

Thus it is seen from the above-described experiments that carrying out catalyst pretreatment at low temperatures insures optimum catalyst activity and selectivity, and eliminates the necessity for critical and difficult control over the time of pretreatment.

The foregoing description contains a limited number of embodiments of the present invention. It will be understood, however, that numerous modifications may be made by those skilled in this art without departing from the spirit of this invention.

What is claimed is:

1. In a process for hydroforming hydrocarbon fractions boiling within the motor fuel range in contact with finely divided hydroforming catalyst particles comprising a group VI metal oxide upon an alumina-containing support in accordance with the fluidized solids technique at temperatures between 850 and 950° F., at pressures between 50 and 500 lbs. per sq. inch and at catalyst to oil weight ratios of about 0.5 to 1.5, the improvement which comprises withdrawing a stream of catalyst particles from a dense, fluidized bed of catalyst in the main reaction zone, regenerating the withdrawn catalyst particles by burning carbonaceous deposits therefrom at temperatures of about 1050–1300° F., withdrawing a second stream of catalyst from the dense, fluidized bed of catalyst in the main reaction zone and discharging the same at substantially reactor temperature into a separate pretreating zone arranged directly below the main reaction zone, discharging a stream of hot, freshly regenerated catalyst particles at substantially regeneration temperature and without contacting with hydrogen-containing or other reducing gases into said pretreating zone, proportioning the amounts of reactor catalyst and regenerated catalyst discharged into said pretreating zone to form a mixture having a temperature below about 1050° F., treating the said mixture in the pretreating zone with a hydrogen-rich gas at a temperature below about 1050° F., carrying the treated mixture of catalyst particles in suspension in the stream of hydrogen-containing gas upwardly through the pretreating zone, adding the major part of the hydrogen-rich gas required in the hydroforming to said suspension and discharging the resultant mixture into the bottom of the main reaction zone.

2. The process as defined in claim 1 in which the mixture of reactor catalyst and regenerated catalyst is treated in said pretreating zone at temperatures of about 950–1000° F. for a period of from about 5 seconds to 15 minutes before discharge into the main reaction zone.

3. The process as defined in claim 2 in which the catalyst comprises about 5 to 15 wt. percent molybdenum oxide upon an alumina-containing support.

4. The process as defined in claim 1 in which the catalyst comprises about 5 to 15 wt. percent molybdenum oxide upon an alumina-containing support.

References Cited in the file of this patent

UNITED STATES PATENTS 2,472,844  Munday et al. _____ June 14, 1949